No. 636,944. Patented Nov. 14, 1899.
O. L. BECKETT.
WAGON COUPLING.
(Application filed June 13, 1898.)
(No Model.)
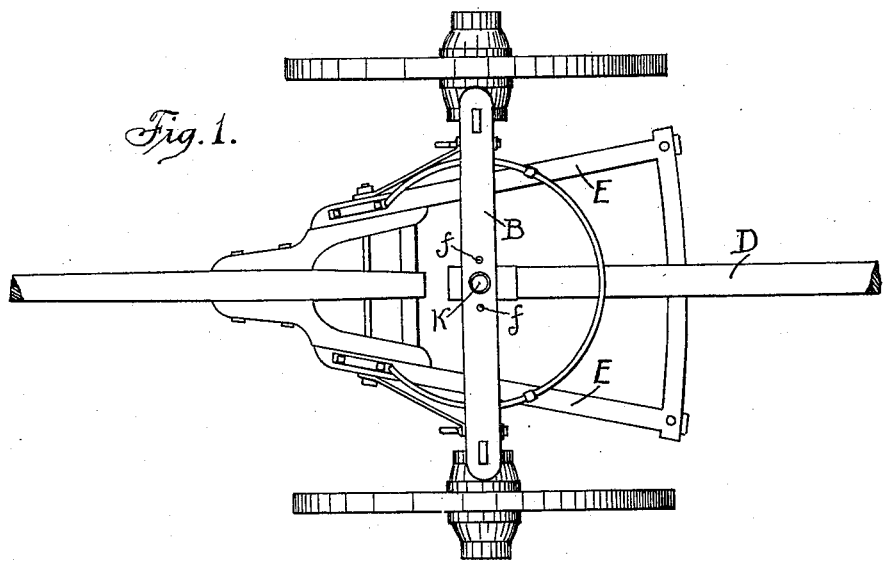
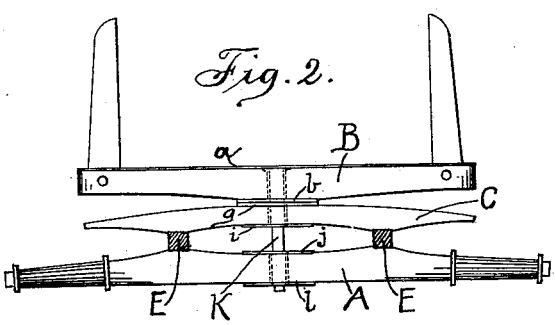
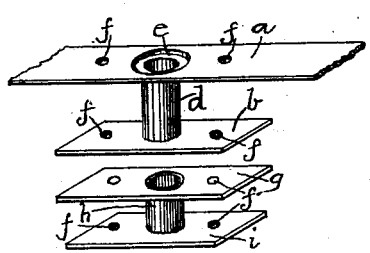
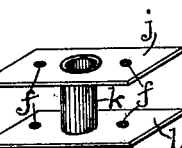
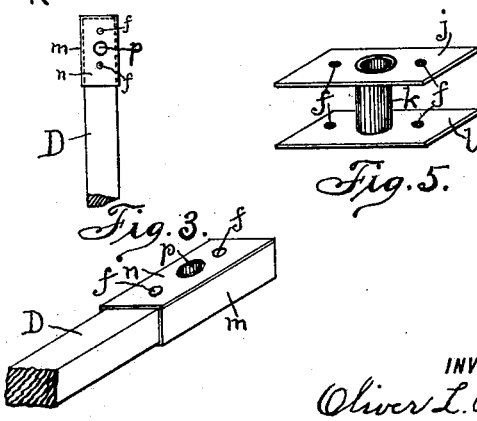
WITNESSES;
A C Murdock
L A Nicholson
INVENTOR;
Oliver L. Beckett.
BY
G. W. Bullard.
ATTORNEY.
THE NORRIS PETERS CO., PHOTO-LITHO., WASHINGTON, D. C.

United States Patent Office.

OLIVER L. BECKETT, OF ORTING, WASHINGTON.

WAGON-COUPLING.

SPECIFICATION forming part of Letters Patent No. 636,944, dated November 14, 1899.

Application filed June 13, 1898. Serial No. 683,325. (No model.)

*To all whom it may concern:*

Be it known that I, OLIVER L. BECKETT, a citizen of the United States, residing at Orting, in the county of Pierce and State of Washington, have invented a certain new and useful Improvement in Wagon-Couplings, of which the following is a specification.

My invention pertains to the king bolt or pin coupling in the front running-gear of an ordinary road-wagon. Its object is to so protect the parts of the wagon through which the pin passes as to prevent the pin-holes being enlarged from wear and the parts being weakened thereby.

The novelty of my improvement is illustrated by the accompanying drawings, in which—

Figure 1 is a top view of the front running-gear of a wagon. Fig. 2 is a front or rear view of the front axle, sand-board, and bolster of a wagon. Fig. 3 represents a top view of the front end of the reach or coupling-pole and an enlarged perspective view of the same. Fig. 4 is an enlarged perspective view of the metallic plates and tubular linings for the hole in the bolster and sand-board, and Fig. 5 is a perspective view of the plates and tubular lining for the hole in the axle of the wagon.

Similar letters refer to similar parts in the several views.

In the ordinary road-wagon the bolster, sand-board, and axle are made of wood, and the king bolt or pin is put in a hole bored through them without being protected or reinforced in any way to prevent wear. The force of the reach or coupling-pole on this pin in time so wears and enlarges the pin-hole as to greatly weaken these parts of the wagon, and thus cause it to break down. This is especially true in a rough or mountainous country, where the strain and wear on these parts of a wagon are very great. My improvement is designed to so reinforce, protect, and strengthen these parts of the wagon as to prevent the king-pin hole being enlarged, and thus obviate breakage on account of the parts being weakened from wear. I accomplish this result by means of my newly-devised improvements, illustrated in the accompanying drawings.

The front axle is represented at A, and B is the front bolster; C, the sand-board.

D is the reach.

The front hounds are indicated by E, and the king-bolt by K.

The top of the bolster is protected by means of a thin metal plate $a$, extending from end to end. In the center is a socket-like depression $e$, in the bottom of which is fixed a tubular extension $d$, that fits neatly in the king-pin hole of the bolster. On the under side of the bolster is a pivotal sliding plate $b$, with a central hole large enough to receive the lower end of the tube $d$. The plates are firmly anchored to the bolster by means of rivet-bolts through the holes $f$. The socket $e$ allows the head of the pin to rest flush with the top of the bolster. These plates, with the connecting tubular lining fitted in the hole, protect the bolster from wear and greatly add to its strength. The hole in the sand-board is similarly protected by means of plates $g$ and $i$ and a tubular connection $h$, lining the king-pin hole. Likewise the axle-tree is protected by means of the plates $j$ and $l$ and the connecting tubular lining $k$. The king-pin is thus confined within the metal linings and has no contact with the wooden members of the wagon, and the parts are not worn nor weakened thereby.

The reach is protected by fitting the front end in a metallic box-like case $m$, having a tubular opening $p$ fixed through its center, thus forming a metal-lined hole for the king-pin. A top piece $n$ is fixed in place with rivet-bolts, thus not only forming a protection to the hole, but also to the sides of the reach.

With these improvements added to a wagon it will be so protected from wear and tear that the parts will not be worn nor weakened sooner than other parts of the wagon.

Having thus described my invention, what I claim as new, and desire to secure by Letters Patent, is—

1. The combination with the three sets of plates and tubular connections, each set composed of an upper and lower plate and an intermediate connecting metallic tube, the top plate of the uppermost set having a depressed socket around the upper end of the connecting-tube, of the bolster lying between the plates of the uppermost set and receiving the metallic tube thereof, the sand-board lying between the plates of the middle set and receiving the metallic tube thereof, the axle lying between the plates of the lowermost set and receiving the metallic tube thereof, and the king bolt or pin passing through the metallic tubes of the three sets of plates which register one with the other, the head of said bolt lying within the socket of the top plate of the uppermost set of plates, substantially as described.

2. The combination with the bolster, the sand-board, and the axle, each formed with a king-bolt hole and provided with a top and bottom plate connected by a metal tube, the tubes of the several plates registering with one another and passing through the king-bolt holes of the bolster, sand-board and axle, of the reach provided at its front end with a metallic box-like case $m$ formed with a metal tube passing through the king-bolt hole formed in the reach and having a top piece constituting a cover to the box-like case $m$ and overlying the top of the reach and bolted in position, substantially as described.

In testimony whereof I affix my signature in the presence of two witnesses.

OLIVER L. BECKETT.

Witnesses:
G. W. BULLARD,
L. B. LOCKWOOD.